(12) United States Patent
Maeda

(10) Patent No.: US 7,072,011 B2
(45) Date of Patent: Jul. 4, 2006

(54) LIQUID CRYSTAL DISPLAY DEVICE AND ELECTRONIC APPARATUS

(75) Inventor: Tsuyoshi Maeda, Ryuo-cho (JP)

(73) Assignee: Seiko Epson Corporation, Tokyo (JP)

( * ) Notice: Subject to any disclaimer, the term of this patent is extended or adjusted under 35 U.S.C. 154(b) by 20 days.

(21) Appl. No.: 10/615,049

(22) Filed: Jul. 9, 2003

(65) Prior Publication Data
US 2004/0061817 A1 Apr. 1, 2004

(30) Foreign Application Priority Data
Jul. 23, 2002 (JP) .............................. 2002-214296

(51) Int. Cl.
*G02F 1/1335* (2006.01)
(52) U.S. Cl. .................................................. 349/114
(58) Field of Classification Search ................ 349/114
See application file for complete search history.

(56) References Cited

U.S. PATENT DOCUMENTS

| 6,620,655 B1* | 9/2003 | Ha et al. ..................... 438/149 |
| 6,697,138 B1* | 2/2004 | Ha et al. ..................... 349/114 |
| 6,704,081 B1* | 3/2004 | Ha et al. ..................... 349/114 |
| 6,717,632 B1* | 4/2004 | Ha et al. ..................... 349/43 |
| 6,734,935 B1* | 5/2004 | Kim et al. ................... 349/114 |
| 6,753,939 B1* | 6/2004 | Jisaki et al. ................ 349/114 |
| 6,788,367 B1* | 9/2004 | Chang et al. ................ 349/114 |
| 6,809,785 B1* | 10/2004 | Fujino ......................... 349/114 |
| 6,819,379 B1* | 11/2004 | Kubo et al. .................. 349/114 |
| 6,831,718 B1* | 12/2004 | Wei et al. .................... 349/114 |

FOREIGN PATENT DOCUMENTS

| JP | A 11-242226 | 9/1999 |
| JP | 11-316382 | 11/1999 |
| JP | 2000-180881 | 6/2000 |
| JP | 2000-187210 | 7/2000 |
| JP | 2000-267081 | 9/2000 |
| JP | 2000-275660 | 10/2000 |
| JP | 2000-305110 | 11/2000 |
| JP | A 2000-305099 | 11/2000 |

* cited by examiner

*Primary Examiner*—James A. Dudek
(74) *Attorney, Agent, or Firm*—Oliff & Berridge, PLC

(57) ABSTRACT

The invention provides a transflective liquid crystal display device which performs high-contrast display for both the transmissive display and the reflective display. A liquid crystal display device according to the present invention has transmissive a display area and a reflective display area at each dot. In addition, it has a reflective electrode disposed in the reflective display area and also has a thickness-adjusting layer to adjust a liquid crystal layer disposed therein in order to make a liquid crystal layer thinner in the reflective display area than in the transmissive display area. Also, the upper surface of an edge portion of the reflective electrode, the edge portion lying in a boundary area between the transmissive display area and the reflective display area, is arranged so as to serve as a mirror reflective surface.

5 Claims, 6 Drawing Sheets

LIQUID CRYSTAL DISPLAY DEVICE AND ELECTRONIC APPARATUS

BACKGROUND OF THE INVENTION

1. Field of Invention

The present invention relates to liquid crystal display devices and electronic apparatuses. More specifically, the invention relates to a multi-gap-type transflective liquid crystal display device in which the thicknesses of a liquid crystal layer is enhanced or optimized in accordance with transmissive and reflective display areas.

2. Description of Related Art

Related art transflective liquid crystal display devices combining two types of display modes, such as reflective display and transmissive display modes, produce a clear display even in a dark environment while reducing power consumption. These devices achieve this by selecting the reflective mode or the transmissive mode in accordance with the level of brightness of the ambient light.

Such related art transflective liquid crystal display devices include a liquid crystal display device in which a liquid crystal layer is sandwiched between upper and lower substrates, and a reflective film composed of, for example, aluminum and having slits to pass light therethrough is disposed on the inner surface of the lower substrate such that the reflective film serves as a transflective film. In this case, in the reflective mode, external light incident from the upper substrate side contributes to performing display such that the light is passed through the liquid crystal layer, then reflected from the reflective film disposed on the inner surface of the lower substrate, again passed through the liquid crystal layer; and emitted from the upper substrate. In the transmissive mode, light emitted from a backlight and incident from the lower substrate side contributes to performing display such that the light is passed through the slits of the reflective film and the liquid crystal layer and then emitted outside from the upper substrate. Accordingly, in this case, the areas of the reflective film where the slits are formed serve as the transmissive display areas and other areas having no slit of the reflective film serve as the reflective display areas.

In the transflective liquid crystal display device, since the change in polarization state is a function of the product (i.e., retardation $\Delta n \cdot d$) of a degree $\Delta n$ of the anisotropy of refractive index of liquid crystal and the thickness "d" of a liquid crystal layer, highly visible display can be achieved by enhancing or optimizing the retardation. However, since reflective display light passes through the liquid crystal layer twice while transmissive display light passes through the liquid crystal layer only once, it is difficult to enhance or optimize the retardation $\Delta n \cdot d$ for both the transmissive display light and the reflective display light. When the thickness of the liquid crystal layer is set so as to provide highly visible display in the reflective mode, the display in the transmissive mode is sacrificed. On the other hand, when the thickness of the liquid crystal layer is set so as to provide highly visible display in the transmissive mode, the display in the reflective mode is sacrificed.

To address or solve the above problem, Japanese Unexamined Patent Application Publication No. 11-242226 discloses a liquid crystal display device having a structure in which a liquid crystal layer is thinner in the reflective display area than in the transmissive display area. Such a structure is called a multi-gap type display device and is achieved, for example, by providing a thickness-adjusting layer to adjust the thickness of the liquid crystal layer, having apertures in parts thereof corresponding to the transmissive display areas, below transparent electrodes of the lower substrate and above the reflective film. That is, since the liquid crystal layer is thicker in the transmissive display area than in the reflective display area by the thickness of the thickness-adjusting layer, the retardation $\Delta n \cdot d$ can be enhanced or optimized for both the transmissive display light and the reflective display light. When the thickness-adjusting layer is used in order to adjust the thickness of the liquid crystal layer, the thickness-adjusting layer is required to have a considerable thickness. To satisfy such a requirement, the thickness-adjusting layer is formed from a photosensitive resin, for example.

SUMMARY OF THE INVENTION

In the above-mentioned multi-gap-type transflective liquid crystal display device, the thickness-adjusting layer with apertures to adjust the thickness of the liquid crystal layer is formed from a photosensitive resin or the like by a photolithography technique. However, the edge of each aperture of the thickness-adjusting layer, that is, the boundary area between the transmissive display area and the reflective display area, ends up being a tapered surface due to exposure accuracy in the above forming step, side-etching in a development step, or the like. As a result, in the boundary area between the transmissive display area and the reflective display area, the thickness of the liquid crystal layer varies continuously, and therefore the retardation $\Delta n \cdot d$ thereof also varies continuously, resulting in an inappropriate value for both the transmissive display light and the reflective display light in the boundary area. Also, although the initial alignment state of liquid crystal molecules constituting the liquid crystal layer is defined by alignment films respectively disposed on the upper and lower substrates, since the aligning regulatory force of the alignment films acts at an angle on the liquid crystal molecules lying in the boundary area in which the tapered surface is disposed, the alignment of the liquid crystal molecules is adversely affected in this area.

Alternatively, even when the edge of the aperture of the thickness-adjusting layer, that is, the boundary area between the transmissive display area and the reflective display area is formed so as to have a step perpendicular to the surfaces of the substrates instead of having a tapered surface, the alignment of the liquid crystal molecules is adversely affected in the boundary area between the transmissive display area and the reflective display area.

In the related art multi-gap-type transflective liquid crystal display device, when it is designed so as to function in a normally white mode, for example, it is expected to perform black display upon a voltage being applied on the liquid crystal layer. However, the above-mentioned disturbance actually causes leakage of light in the boundary area between the transmissive display area and the reflective display area, thereby leading to a deteriorated contrast.

The present invention addresses or solves the above and/or other problems, and provides a transflective liquid crystal display device which performs high-contrast display for both the transmissive display and the reflective display. The present invention also provides an electronic apparatus equipped with the foregoing liquid crystal display device, to perform high-quality display.

In order to address or achieve the above, a liquid crystal display device according to the present invention, in which a liquid crystal layer is sandwiched between a first substrate and a second substrate, includes transmissive display areas through which light incident from the outer surface of the first substrate is transmitted to perform transmissive display; reflective display areas from which light incident from the outer surface of the second substrate is reflected to perform reflective display; a reflective film disposed in the reflective display areas; and a thickness-adjusting layer to adjust the thickness of the liquid crystal layer, disposed on the inner surface of at least one of the first and second substrates, such that the liquid crystal layer is thinner in the reflective display area than in the transmissive area. An edge portion of the reflective film lying in a boundary area between the transmissive display area and the reflective display area has an upper surface serving as a mirror reflective surface. The term "boundary area" in this specification means the boundary between the reflective display area and the transmissive display area, defined by the edge of the reflective film, and the edge portion of the reflective display area next to the above boundary.

A feature of the liquid crystal display device according to the present invention is that the upper surface of the edge portion of the reflective film lying in the boundary area between the transmissive display area and the reflective display area serves as a mirror reflective surface.

With this feature, although the boundary area is regarded as a part of the reflective display area because of having the reflective film formed therein, since the upper surface of the above-mentioned part serves as a mirror reflective surface, external light coming from the outer surface of the second substrate is regularly reflected in this boundary area. However, since when a user operates the liquid crystal display device in the usual way, the user does not see the liquid crystal display device from the regularly reflecting direction of external light such as sunlight or illuminating light, light reflected from the mirror reflective surface at the time of performing black display does not enter the eyes of the user, and therefore a contrast deterioration of the reflective display can be reduced or prevented. In addition, since the reflective film is present in the boundary area, this feature does not have an adverse affect on the transmissive display. Accordingly, in the boundary area between the reflective display area and the transmissive display area, when the thickness of the thickness-adjusting layer varies continuously and the retardation $\Delta n \cdot d$ in the boundary area varies continuously, or even when the alignment of liquid crystal molecules is disturbed, high-contrast display for both the transmissive display and the reflective display can be achieved.

The liquid crystal display device may have a structure in which, at each dot, an edge portion of the thickness-adjusting layer forms a tapered surface in the boundary area between the reflective display area and the transmissive display area, and a part of the edge portion of the reflective film, the part facing the tapered surface, serves as a mirror reflective surface.

When the thickness-adjusting layer is formed by a photosensitive resin as described with regard to the related art, the edge of the aperture of the thickness-adjusting layer, that is, the boundary area between the transmissive display area and the reflective display area, sometimes constitutes a tapered surface depending on the situation of a photolithography step. In this case, as the thickness of the liquid crystal layer varies continuously, the retardation $\Delta n \cdot d$ varies continuously. Even in such a case, the above structure prevents a contrast deterioration of the reflective display, thereby achieving high-contrast display for both the transmissive display and the reflective display.

Furthermore, the reflective film preferably includes a light-scattering device to scatter reflected light on the portion not serving as a mirror reflective surface.

With this structure, since the reflective film has the light scattering device on the upper surface except the portions serving as the mirror reflective surface, that is, the area which contributes effectively to the reflective display, the reflected light is scattered and sufficient amount of light entering the eyes of the user can be secured, thereby achieving a brighter reflective display.

The liquid crystal display device may further include a color filter on either one of the first and second substrates.

With this structure, a transflective liquid crystal display device performing color display can be achieved.

An electronic apparatus according to the present invention includes the liquid crystal display device according to the present invention. With this structure, an electronic apparatus allowing selection between transmissive display and reflective display and performing high quality color display can be provided.

DETAILED DESCRIPTION OF PREFERRED EMBODIMENTS

First Exemplary Embodiment

A first exemplary embodiment of the present invention is described below with reference to FIGS. 1 to 5.

Figure 1:
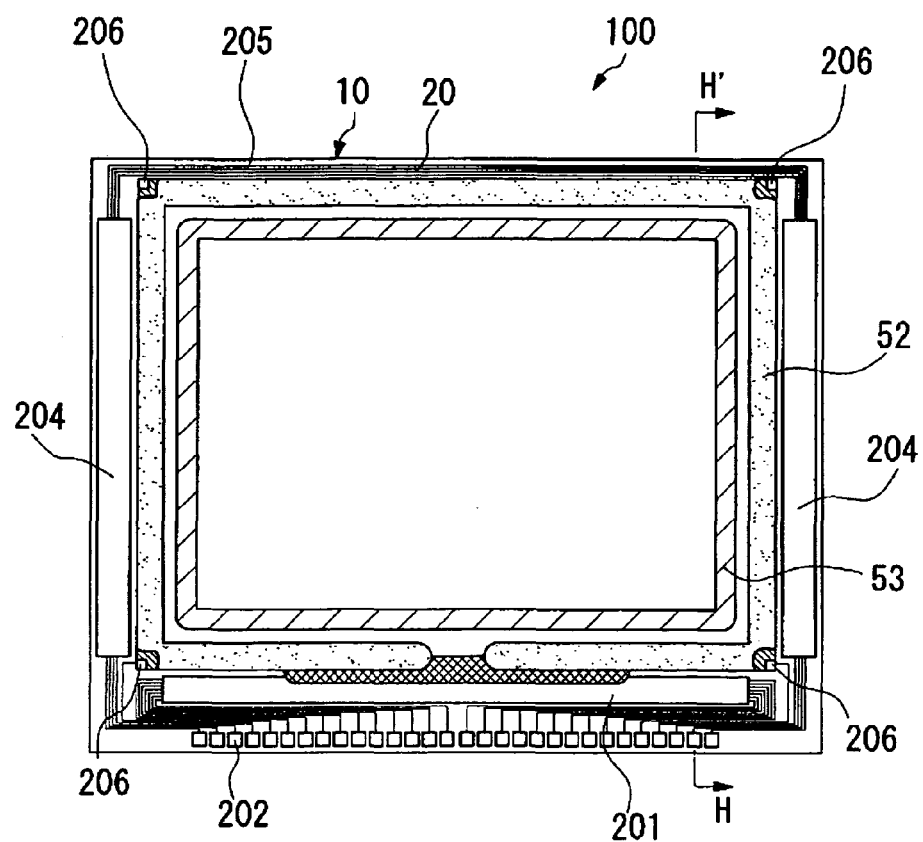
FIG. 1 is a plan view of a liquid crystal display device according to a first exemplary embodiment of the present invention.
Figure 2:
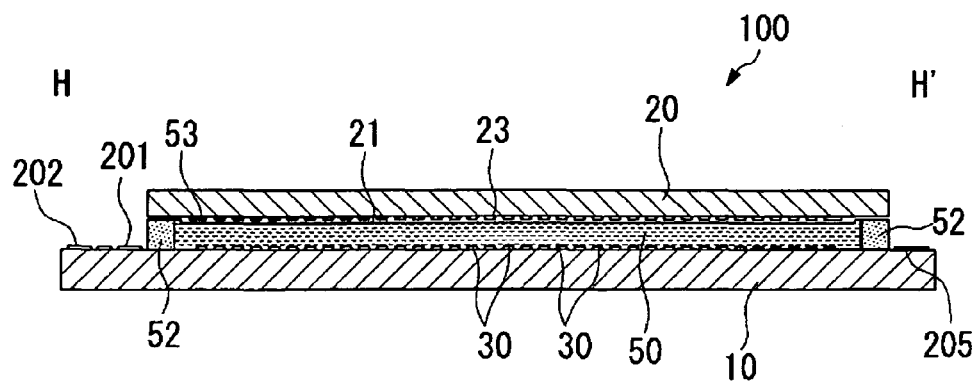
FIG. 2 is a sectional view taken along plane H–H' indicated in FIG. 1.
Figure 3:
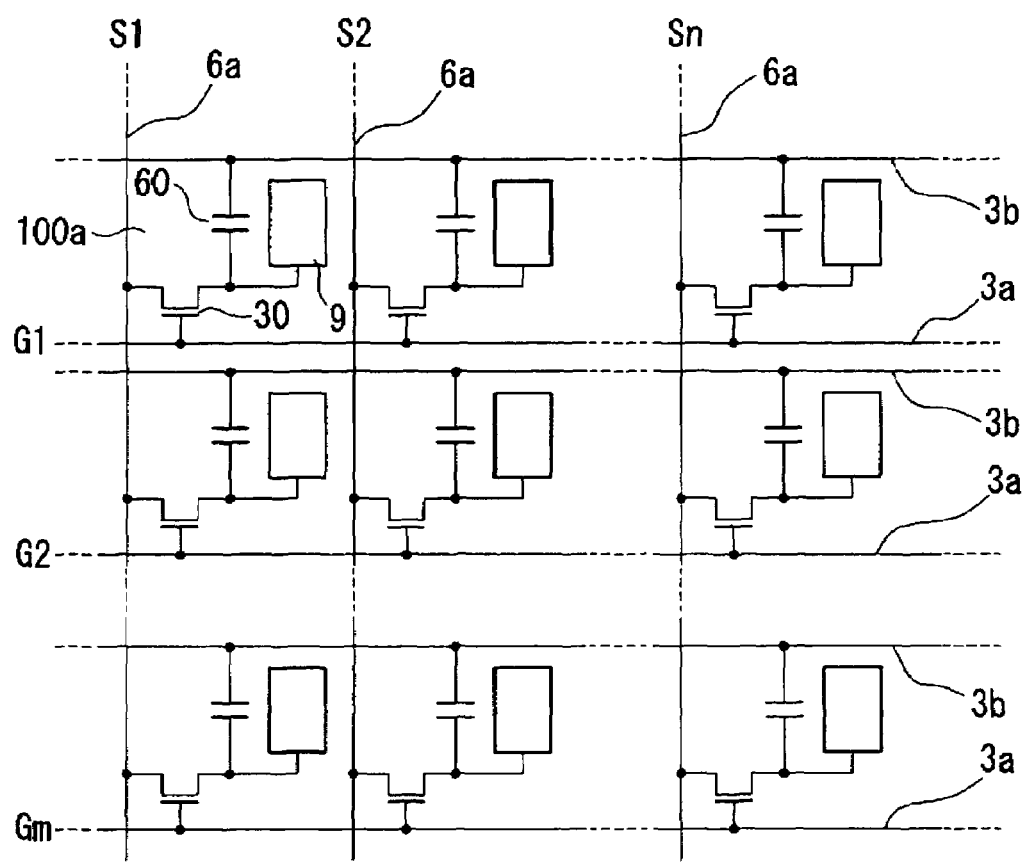
FIG. 3 is a schematic circuit diagram of a variety of elements, wire lines, and so forth of a plurality of pixels formed in a matrix manner in an image display area of the liquid crystal display device shown in FIG. 1.

In this exemplary embodiment, an active-matrix, transflective liquid crystal display device of a reflector built-in type in which pixel electrodes on an element substrate serve also as a reflector is described below by way of example. FIG. 1 is a plan view of a liquid crystal display device according to this exemplary embodiment and its components, viewed from a counter substrate, and FIG. 2 is a sectional view taken along plane H-H' indicated in FIG. 1. FIG. 3 is a schematic circuit diagram of a variety of elements, wiring lines, and so forth of a plurality of pixels formed in a matrix manner in an image display area of an electro-optical device (i.e., the liquid crystal display device shown in FIG. 1). In each figure which will be referred to in the following description, each of the layers and the components has a different reduced scale so as to be easily viewed in the figures.

General Structure of Liquid Crystal Display Device

As shown in FIGS. 1 and 2, a liquid crystal display device 100 according to this exemplary embodiment has a TFT array substrate 10 and a counter substrate 20 bonded to each other by a sealant 52, and a liquid crystal layer 50 filled in the area enclosed by the sealant 52. A light shielding film (peripheral partition) 53 composed of a light shielding material is formed in the inner side of the sealant 52 forming area. In the outer side of the sealant 52, a data-line drive circuit 201 and external-circuit connection terminals 202 are formed along a side of the TFT array substrate 10, and scanning-line drive circuits 204 are formed along two sidesthereof next to the foregoing side. Along the remaining side of the TFT array substrate 10, a plurality of wire lines 205 for connecting the scanning-line drive circuits 204 formed along both sides of an image display area is disposed.

Also, the counter substrate 20 has substrates-interconnecting conductive materials 206 disposed at its corners to electrically connect the TFT array substrate 10 with the counter substrate 20.

Instead of forming the data-line drive circuit 201 and the scanning-line drive circuits 204 on the TFT array substrate 10, for example, a TAB (tape automated bonding) substrate having a drive LSI mounted thereon and a group of terminals formed around the TFT array substrate 10 may be electrically and mechanically connected with each other via an anisotropic conductive film.

In the liquid crystal display device 100, although retardation films, polarizers, and so forth are disposed in respectively predetermined directions depending on the type of liquid crystal used, that is, in accordance with an operation mode, such as a TN (twisted nematic) mode or an STN (super twisted nematic) mode, and also depending on whether using a normally white mode or a normally black mode, they are not shown in the figures.

In the image display area of the liquid crystal display device 100 having the above-mentioned structure, as shown in FIG. 3, a plurality of dots 100a are disposed in a matrix array. In addition, a pixel-switching TFT (thin film transistor) 30 is formed at each dot 100a, and data lines 6a for feeding pixel signals S1, S2, - - - , Sn are electrically connected to sources of the corresponding TFTs 30. The pixel signals S1, S2, - - - , Sn to be written to the data lines 6a may be fed in a line-sequential manner in that order, or may be fed to the data lines 6a group by group, each including a plurality of the adjacent data lines 6a. Also, a scanning line 3a is electrically connected to a gate of each TFT 30, and scanning signals G1, G2, - - - , Gm having a pulse wave form are applied to the scanning lines 3a with a predetermined timing in a line-sequential manner in that order. A pixel electrode 9 is electrically connected to a drain of each TFT 30, and, by holding the TFTs 30 serving as switching elements in an on-state for a predetermined time period, the pixel signals S1, S2, - - - , Sn fed from the data lines 6a are written into the corresponding pixels with a predetermined timing. The pixel signals S1, S2, - - - , Sn at a predetermined level, written into the liquid crystal via the pixel electrodes 9 as described above, are held between counter electrodes 21 of the counter substrate 20 shown in FIG. 2 and the corresponding pixel electrodes 9 for a predetermined time period. Also, in order to reduce or prevent the leakage of the held pixel signals S1, S2, - - - , Sn, storage capacitors 80 are additionally formed in parallel with corresponding liquid crystal capacitors formed between the pixel electrodes 9 and the counter electrodes 21. Reference numeral 3b is capacitor lines constituting the corresponding storage capacitors 80.

Detailed Structure of One Dot

Figure 4:
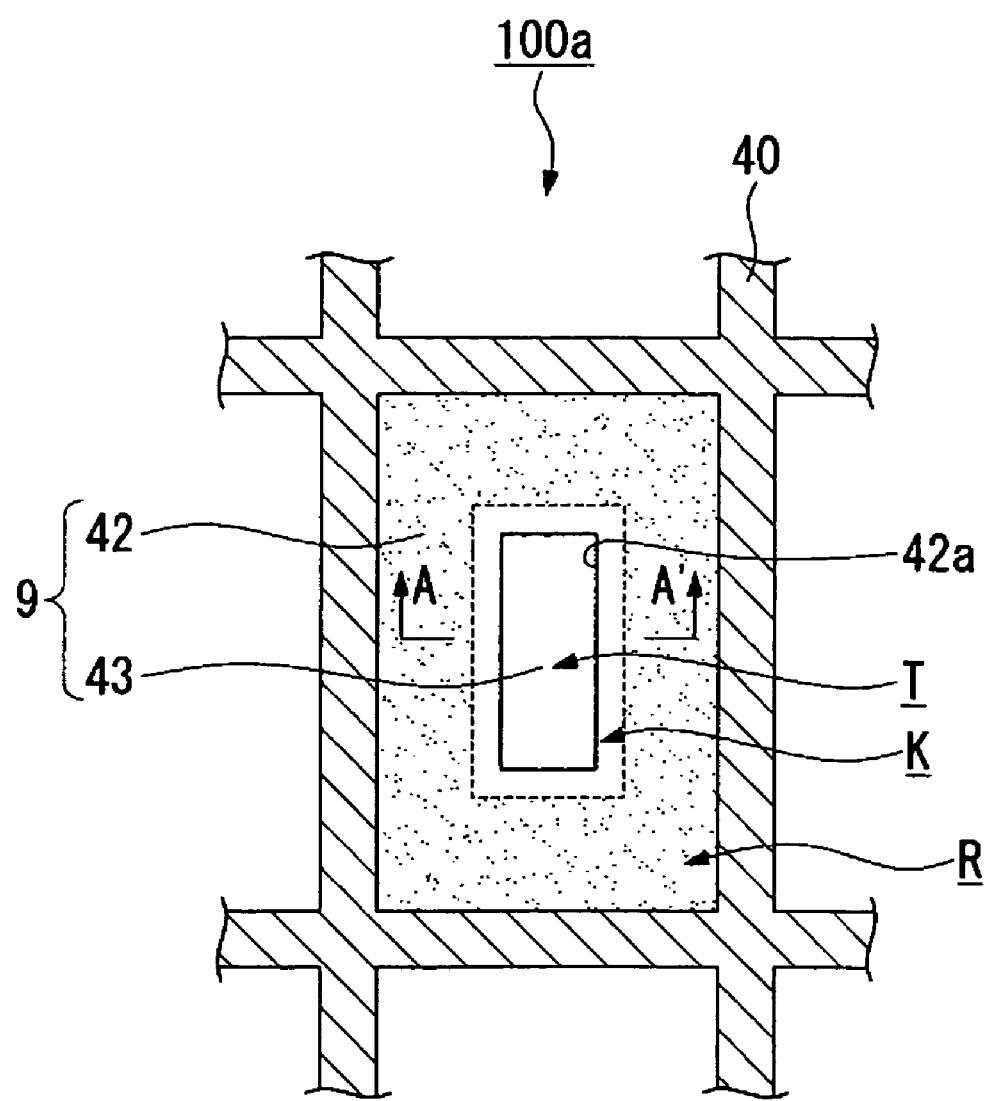
FIG. 4 is a schematic plan view of a dot of the liquid crystal display device shown in FIG. 1.
Figure 5:
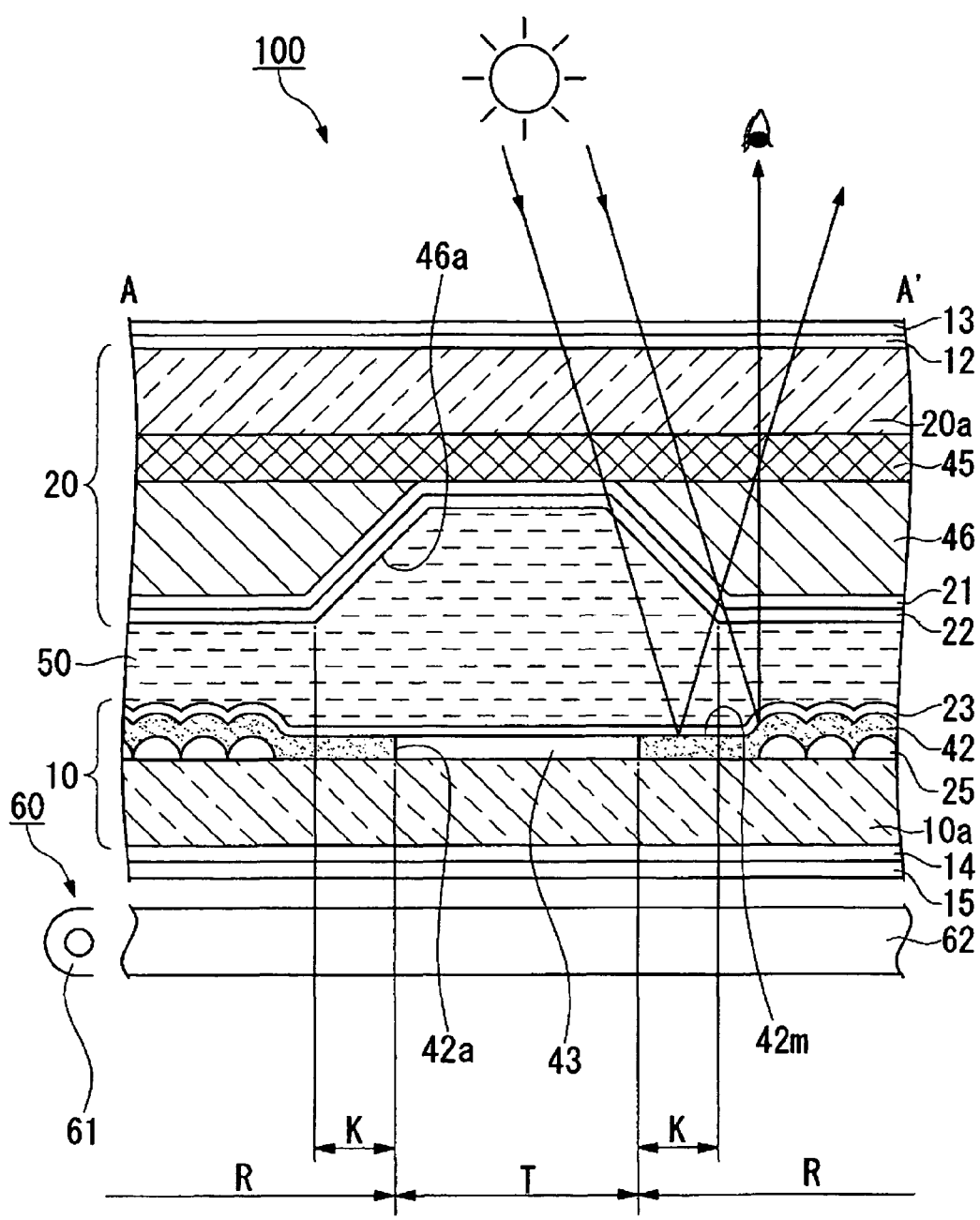
FIG. 5 is a sectional view taken along plane A–A' indicated in FIG. 4.

FIG. 4 is a schematic plan view of one of the dots 100a forming an image of the liquid crystal display device 100 according to this exemplary embodiment. FIG. 5 is a sectional view taken along plane A-A' indicated in FIG. 4. Although wires, such as the data line 6a and the scanning line 3a, the TFT 30, and the like are actually formed on the TFT array substrate 10, these wire lines, the TFT, and the like are not shown in FIG. 4. The liquid crystal display device 100 according to this exemplary embodiment is to perform a color display, and one pixel is formed by three adjacent dots for R (red), G (green), and B (blue).

As shown in FIG. 4, an area partitioned by a light shielding film (black matrix) 40 formed in a latticed array on the counter substrate 20 constitutes one dot 100a. Meanwhile, a reflective electrode 42 serving as a reflector and partly as a pixel electrode is disposed on the TFT array substrate 10. The reflective electrode 42 has an aperture 42a at the center thereof and a transparent electrode 43 disposed in the aperture 42a. The reflective electrode 42 and the transparent electrode 43 constitute the pixel electrode 9 for one dot. With this structure, the aperture 42a of the reflective electrode 42 constitutes a transmissive display area T to perform transmissive display by using light emitted from a backlight, which is described below, and the area in which the reflective electrode 42 lies constitutes a reflective display area R to perform reflective display by using external light incident from the counter substrate 20 side. Although most part of the reflective display area R is adapted to scatter and emit reflected light, as is described below, the periphery of the aperture 42a lying in the boundary area K of the reflective display area R with the transmissive display area T serves as a mirror reflective surface from which reflected light is regularly reflected.

As shown in FIG. 5, the liquid crystal display device 100 according to this exemplary embodiment has a basic structure in which a liquid crystal layer 50 is sandwiched between the TFT array substrate 10 and the counter substrate 20 which are composed of transparent glass or the like and which are respectively disposed above and below so as to oppose each other. Also, a backlight 60 including a light source 61, a light guiding plate 62, and the like is disposed on the outer surface side of the TFT array substrate 10. A retardation film 12 and a polarizer 13 are disposed on the outer surface side of the counter substrate 20 (at a side close to a user), and a retardation film 14 and a polarizer 15 are disposed on the outer surface side of the TFT array substrate 10 (at a side close to the backlight). The polarizers 13 and 15 allow only linearly polarized light, in one direction, of external light coming from above and of the backlight coming from below to be transmitted therethrough, respectively. The retardation films 12 and 14 transform the linearly polarized light respectively transmitted through the polarizers 13 and 15 into circularly polarized light (including elliptically polarized light). Accordingly, the polarizers 13 and 15 together with the retardation films 12 and 14 serve as circularly-polarized-light input means.

On the inner surface side of the counter substrate 20, color filters 45 having R, G, and B coloring layers are disposed, and corresponding to the reflective display area R, a thickness-adjusting layer (insulating layer) 46 to adjust the thickness of the liquid crystal layer 50 is formed on the color filters 45 in order to provide a thick layer area and a thin layer area in the liquid crystal layer 50. More particularly, by providing the thickness-adjusting layer 46 the liquid crystal layer 50 becomes thinner in the reflective display area R than in the transmissive display area T. Also, corresponding to the transmissive display area T, the thickness-adjusting layer 46 has a depression formed between adjacent projections thereof, and has a tapered surface 46a, at an angle of, for example, 10 to 50 degrees with respect to the bottom of the depression in the boundary area K between the reflective display area R and the transmissive display area T. Accordingly, the thickness-adjusting layer 46 has a continuously varying thickness in the boundary area K, and thus the liquid crystal layer 50 also has a continuously varying thickness in the boundary area K. The thickness-adjusting layer 46 is made from, for example, a light transmissive insulating material, such as an acrylic resin.

In this exemplary embodiment, the color filters 45 are uniformly disposed both in the transmissive display area T and the reflective display area R. Instead of this structure, different color filters for the transmissive display area T and the reflective display area R may be formed such that the spectral characteristics of the transmissive-display color filters and the reflective-display color filters are different from each other and such that the transmissive-display color filters have higher color purity than the reflective-display color filters. With this structure, a balance of color tone between the transmissive display area T and the reflective display area R can be adjusted.

Also, the counter substrate 20 has a counter electrode 21, which is made from a transparent conductive film composed of ITO (indium tin oxide) or the like, formed on the entire inner surface thereof so as to cover the color filters 45 and the thickness-adjusting layer 46, and also the counter electrode 21 has an alignment film 22 formed thereon, made from a film composed of, for example, a polymeric material, such as polyimide, which is subjected to a predetermined rubbing treatment.

Meanwhile, on the inner surface side of the TFT array substrate 10, the reflective electrode 42 made from a highly reflective metal film or the like, such as aluminum or silver, and having the aperture 42a is formed, and the transparent electrode 43 made from a transparent conductive film composed of ITO or the like is disposed in the aperture 42a of the reflective electrode 42. As described above, the area in which the transparent electrode 43 is formed corresponds to the transmissive display area T, and the area in which the reflective electrode 42 is formed corresponds to the reflective display area R. On the reflective electrode 42 and the transparent electrode 43, an alignment film 23 made from a polymer film composed of, for example, polyimide, which is subjected to a predetermined rubbing treatment, is provided in the same fashion as in the counter substrate 20.

Also, in the reflective display area R on the upper surface of a substrate body 10a of the TFT array substrate 10, projections 25 composed of, for example, an acrylic resin are formed at the portion corresponding to a flat area of the thickness-adjusting layer 46 in which the boundary area K is absent. Since the reflective electrode 42 is formed so as to cover the projections 25, the reflective electrode 42 has an irregular upper surface reflecting the outer shape of the projections 25. This irregular surface makes light incident on the reflective electrode 42 scattered upon reflection and emitted therefrom. On the other hand, since the boundary area K between the transmissive display area T and the reflective display area R has no projection 25, the upper surface of the reflective electrode 42 in the boundary area serves as a mirror reflective surface 42m, thereby allowing incident light to be emitted only in the regularly reflecting direction.

In the display configuration of the transflective liquid crystal display device, in general, light emitted from the backlight passes only once through the liquid crystal layer in the transmissive display area, while incident light from outside passes twice through the liquid crystal layer in the reflective display area. Taking into consideration of the retardation of the liquid crystal layer, when the alignment of the liquid crystal is controlled by applying the same voltage for the reflective display and the transmissive display, the transmittance of the liquid crystal in the reflective display mode becomes different from that in the transmissive display mode due to the retardation of the liquid crystal.

Meanwhile, with the structure of the liquid crystal display device according to this exemplary embodiment, since the thickness-adjusting layer 46 is disposed in the reflective display area R, the liquid crystal layer 50 is thicker in the transmissive display area T than in the reflective display area R, whereby the travel distance of light passing through the liquid crystal layer 50 in the reflective display area R can be arranged so as to be equal to that in the transmissive display area T. As a result, retardations $\Delta n \cdot d$ in the reflective display area R and the transmissive display area T are equalized, thereby leading to bright, high-contrast display for both the reflective display and the transmissive display.

Whereas, in the boundary area K between the transmissive display area T and the reflective display area R, since the thickness-adjusting layer 46 has the tapered surface 46a, the thickness of the liquid crystal layer 50 varies continuously, and the retardation $\Delta n \cdot d$ thereof in turn varies continuously, whereby the retardation $\Delta n \cdot d$ ends up as an inappropriate value for both the transmissive display light and the reflective display light in the boundary area. Although the initial alignment of liquid crystal molecules constituting the liquid crystal layer 50 is defined by the alignment films 22 and 23, since the aligning regulatory force of the alignment film 23 acts at an angle on the liquid crystal molecules lying in a region in which the tapered surface 46a is disposed, the alignment of the liquid crystal molecules is disturbed in this region.

On the other hand, in this exemplary embodiment, since the reflective electrode 42 has the mirror reflective surface 42m on the upper surface thereof at the portion corresponding to the boundary area K between the transmissive display area T and the reflective display area R, external light coming from the counter substrate 20 side is regularly reflected in this boundary area. However, when a user operates the liquid crystal display device in a usual way, since the user does not see the liquid crystal display device 100 from the regularly reflecting direction of external light such as sunlight or illuminating light, but the user sees it from substantially the front (the normal) direction. Therefore, light reflected from the mirror reflective surface 42m at the time of performing black display is not visible by the eyes of the user, whereby a contrast deterioration of the reflective display can be reduced or prevented. In addition, since the reflective electrode 42 is provided in the boundary area K, this feature does not have an adverse affect on the transmissive display. Meanwhile, since the reflective electrode 42 has an irregular upper surface in the most part of the reflective display area R, except the boundary area K, reflected light is scattered thereat, thereby leading to a bright, visible reflective display. Accordingly, even when the thickness of the thickness-adjusting layer 46 varies continuously and the retardation Δn·d varies continuously in the boundary area K between the reflective display area R and the transmissive display area T, and even when the alignment of liquid crystal molecules is disturbed, a high-contrast display for both the transmissive display and the reflective display can be achieved.

According to research by the present inventor, when the boundary area (the area in which the thickness-adjusting layer has a tapered surface) has a transparent electrode disposed therein, that is, the boundary area is arranged so as to serve as the transmissive display area, for example, the contrasts of the transmissive display and the reflective display are 30 and 50, respectively. Meanwhile, when the boundary area has a reflective electrode disposed therein and also a scattering layer having an irregular surface as in the remaining portion of the reflective display area, the contrasts of the transmissive display and the reflective display are 100 and 15, respectively. As opposed to the above results, when the boundary area has a reflective electrode disposed therein so as to serve as a mirror reflective surface in the same fashion as in this embodiment, the contrasts of the transmissive display and the reflective display are respectively 100 and 50, thereby proving that high-contrast display for both the transmissive display and the reflective display can be achieved.

Second Exemplary Embodiment

Figure 6:
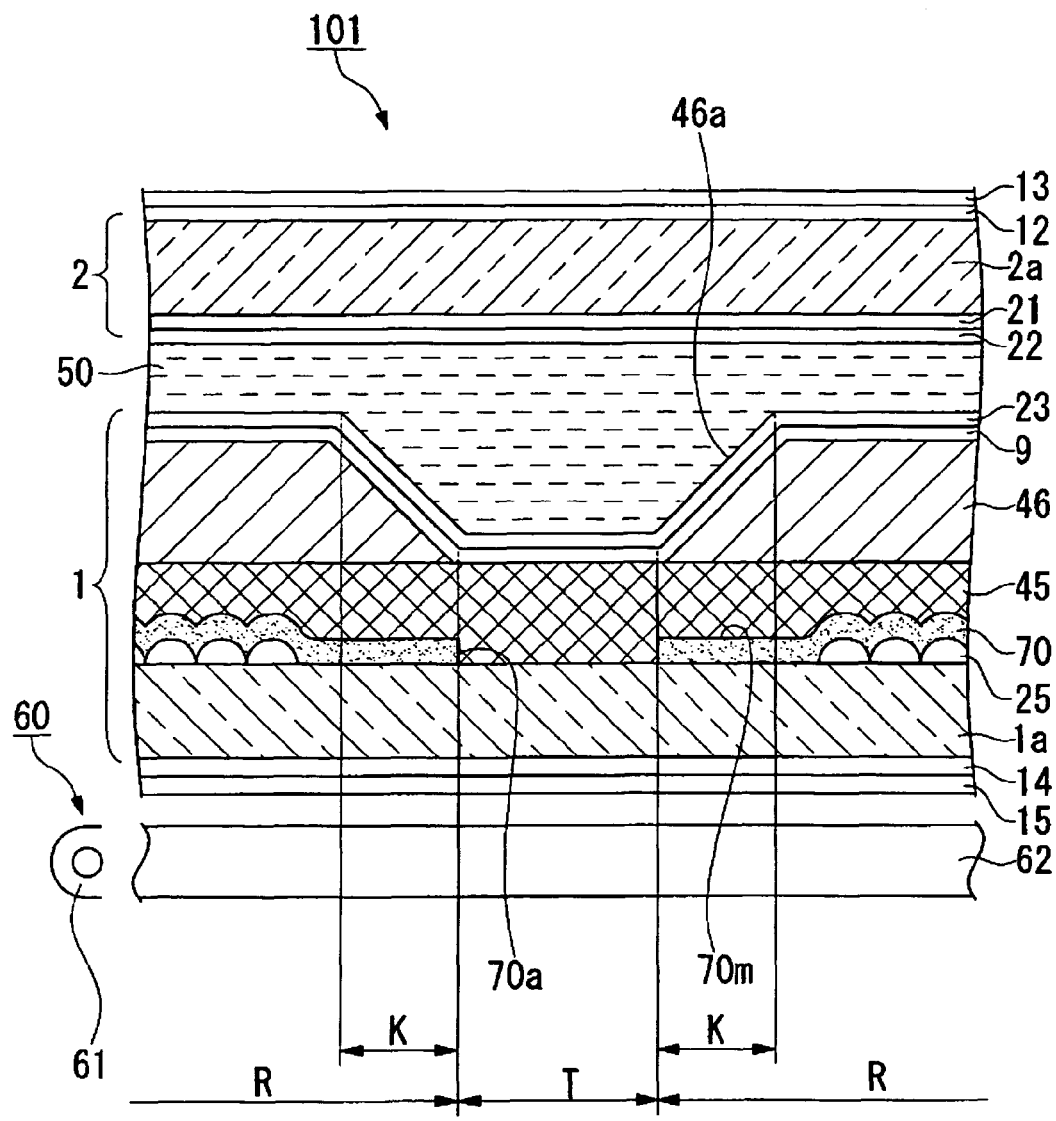
FIG. 6 is a sectional view of a liquid crystal display device according to a second exemplary embodiment of the present invention.

Referring now to FIG. 6, a liquid crystal display device according to a second exemplary embodiment of the present invention is described below.

The liquid crystal display device according to this exemplary embodiment has the same basic structure as in the first exemplary embodiment, but the color filters are disposed close to the lower substrate, and the upper substrate serves as an element substrate. Accordingly, the liquid crystal display device of the second exemplary embodiment is only different in its sectional structure from that of the first exemplary embodiment. Hence, only the sectional structure of the liquid crystal display device is described below, referring to FIG. 6 corresponding to FIG. 5. Also, the components common in FIG. 6 and FIG. 5 are denoted by the same reference characters, and the description thereof is omitted.

As shown in FIG. 6, in a liquid crystal display device 101 according to this exemplary embodiment, a lower substrate 1 has a reflective film 70 having an aperture 70a formed on the inner surface thereof, and the color filters 45 are formed on the inner surface of a substrate body 1a on which the reflective film 70 is disposed. In this exemplary embodiment, the reflective film 70 does not serve as the pixel electrode 9, the area in which the reflective film 70 is provided constitutes the reflective display area R, and the area corresponding the aperture 70a of the reflective film 70 constitutes the transmissive display area T. The thickness-adjusting layer 46 is formed on the color filters 45 in the reflective display area R, and the pixel electrode 9 made from a transparent conductive film composed of ITO or the like and the alignment film 23 are formed on the entire surface of the thickness-adjusting layer 4. Meanwhile, an upper substrate 2 opposing the lower substrate 1 having the liquid crystal layer 50 therebetween has the counter electrode 21 and the alignment film 22 on the inner surface thereof in that order. Also in this exemplary embodiment, although the reflective film 70 has the irregular upper surface due to the profile of the projections 25 formed on the substrate body 1a of the lower substrate 1, the reflective film 70 does not have irregularities at the portion corresponding to the boundary area K between the transmissive display area T and the reflective display area R, that is, on the tapered surface 46a of the thickness-adjusting layer 46. Instead, the reflective film 70 has a mirror reflective surface 70m in the boundary area.

Also in the liquid crystal display device 101 according to this exemplary embodiment, since the reflective film 70 has the mirror reflective surface 70m on the upper surface at the portion corresponding to the boundary area K between the transmissive display area T and the reflective display area R, and regular reflection occurs in this area, the contrast in the reflective display is not deteriorated even when this boundary area serves as the reflective display area R. As a result, the same advantage of high-contrast display for both the transmissive display and the reflective display as in the first exemplary embodiment can be obtained.

[Exemplary Electronic Apparatus]

Exemplary electronic apparatuses equipped with the liquid crystal display device according to any one of the foregoing exemplary embodiments are described below.

Figure 7:
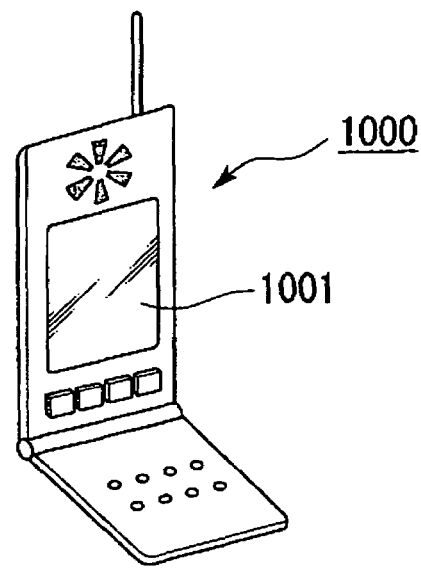
FIG. 7 is a perspective view of an exemplary electronic apparatus equipped with any one of the liquid crystal display devices.

FIG. 7 is a perspective view of a portable phone, as an example. In FIG. 7, reference numerals 1000 and 1001 respectively represent a main body of the portable phone and a liquid crystal display unit using any one of the foregoing liquid crystal display devices.

Figure 8:
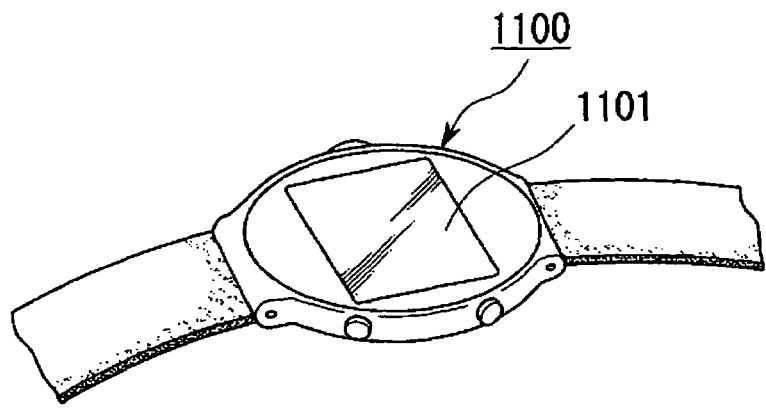
FIG. 8 is a perspective view of another exemplary electronic apparatus equipped with any one of the liquid crystal display devices.

FIG. 8 is a perspective view of a wristwatch-type electronic apparatus, as an example. In FIG. 8, references 1100 and 1101 respectively represent a main body of the watch and a liquid crystal display unit using any one of the foregoing liquid crystal display devices.

Figure 9:
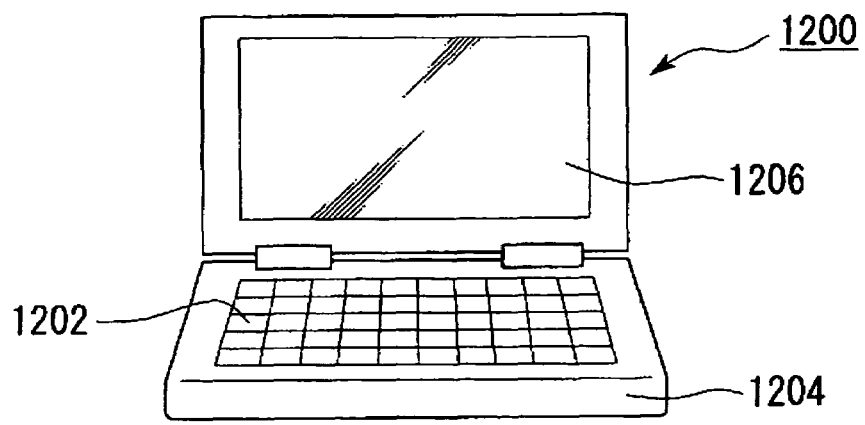
FIG. 9 is a perspective view of still another exemplary electronic apparatus equipped with any one of the liquid crystal display devices.

FIG. 9 is a perspective view of a portable information processor, such as a word processor or a personal computer, as an example. In FIG. 9, reference numerals 1200, 1202, 1204, and 1206 respectively represent an information processor, an input unit including a keyboard, a main body of the information processor, and a liquid crystal display unit using any one of the foregoing liquid crystal display devices.

Each of the exemplary electronic apparatuses shown in FIGS. 7 to 9 is equipped with a liquid crystal display unit using any one of the liquid crystal display devices according to the foregoing exemplary embodiments, thereby achieving an electronic apparatus which is equipped with a display unit featuring bright, high-contrast display in a variety of environments and which thus performs high-quality color display. Also, an electronic apparatus equipped with a display unit which rarely performs poor-quality display even in the boundary area between the reflective display area and the transmissive display area can be achieved.

[Advantages]

As described above in detail, in each of the liquid crystal display devices according to the present invention, since the reflective film has a mirror reflective surface on the upper surface thereof in the boundary area between the transmissive display area and the reflective display area, and regular reflection occurs in the boundary area, the contrast in the reflective display is not deteriorated even when the boundary area serves as the reflective display area, whereby high-contrast display for both the transmissive display and the reflective display can be achieved.

What is claimed is:

1. A liquid crystal display device, comprising:
a first substrate;
a second substrate;
a liquid crystal layer sandwiched between the first substrate and the second substrate;
transmissive display areas through which light incident from an outside of the first substrate is transmitted to perform transmissive display;
reflective display areas from which light incident from an outside of the second substrate is reflected to perform reflective display;
a thickness-adjusting layer to adjust a thickness of the liquid crystal layer, the thickness-adjusting layer being disposed between the liquid crystal layer and an inner surface of at least one of the first substrate and the second substrate, such that the liquid crystal layer is thinner in the reflective display areas than in the transmissive areas, the thickness-adjusting layer having a boundary area between thinner portions and thicker portions of the thickness-adjusting layer; and
a reflective film disposed in the reflective display areas, the reflective film having a light-scattering surface including projections, an edge portion of the reflective film lying in the a boundary area of the thickness-adjusting layer, the edge portion of the reflective film having an upper surface serving as a mirror reflective surface.

2. The liquid crystal display device according to claim 1, an edge portion of the thickness-adjusting layer forming a tapered surface in the boundary area between the reflective display area and the transmissive display area, and a part of the edge portion of the reflective film, corresponding to the tapered surface, serving as a mirror reflective surface.

3. The liquid crystal display device according to claim 1, the light-scattering surface comprises an irregular upper surface.

4. The liquid crystal display device according to claim 1, further comprising a color filter on at least one of the first substrate and the second substrate.

5. An electronic apparatus, comprising:
the liquid crystal display device according to claim 1.

* * * * *